(12) United States Patent
McKenna et al.

(10) Patent No.: US 12,301,540 B2
(45) Date of Patent: May 13, 2025

(54) DISTRIBUTED HARDWARE VULNERABILITY IDENTIFICATION AND RESOLUTION

(71) Applicant: Microsoft Technology Licensing, LLC, Redmond, WA (US)

(72) Inventors: Riley Joseph McKenna, Sammamish, WA (US); Kevin Matthew Martin, Seattle, WA (US); Kristopher Michael Thomas, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 228 days.

(21) Appl. No.: 17/840,035

(22) Filed: Jun. 14, 2022

(65) Prior Publication Data

US 2023/0403255 A1 Dec. 14, 2023

(51) Int. Cl.
*H04L 9/40* (2022.01)

(52) U.S. Cl.
CPC ...... *H04L 63/0236* (2013.01); *H04L 63/0263* (2013.01); *H04L 63/0876* (2013.01); *H04L 63/102* (2013.01)

(58) Field of Classification Search
CPC ............ H04L 63/0236; H04L 63/0263; H04L 63/0876; H04L 63/102; H04L 63/1416;
(Continued)

(56) References Cited

U.S. PATENT DOCUMENTS

| 11,637,862 B1* | 4/2023 | Sopan | G06N 5/025 |
| | | | 726/23 |
| 2003/0212779 A1* | 11/2003 | Boyter | H04L 63/1433 |
| | | | 709/223 |

(Continued)

FOREIGN PATENT DOCUMENTS

WO 2005033943 A1 4/2005

OTHER PUBLICATIONS

Sun, Yuqiong, Susanta Nanda, and Trent Jaeger. "Security-as-a-service for microservices-based cloud applications." 2015 IEEE 7th International Conference on Cloud Computing Technology and Science (CloudCom). IEEE. (Year: 2015).*

(Continued)

*Primary Examiner* — John M MacIlwinen
(74) *Attorney, Agent, or Firm* — Schwegman Lundberg & Woessner, P.A.

(57) ABSTRACT

Various embodiments herein include distributed hardware vulnerability identification and resolution. One method embodiment includes conducting an inventory of devices on a network and generating a queue of scanning jobs for each inventoried device to discover possible modes of network entry via each device. The method then proceeds by scanning devices on the network that are to be blocked according to a stored representation of an expected configuration of each device to identify devices of interest and queuing a new job for a deep scan of each device of interest. Each deep scan is executed to search one or both of a greater portion and in greater detail of a device of interest than prior scanning. The method then passes deep scan results to an incident manager to open an incident ticket for each device of interest.

20 Claims, 4 Drawing Sheets

(58) Field of Classification Search
CPC .... H04L 63/1433; H04L 41/5074; G06F 21/577
See application file for complete search history.

(56) References Cited

U.S. PATENT DOCUMENTS

| | | | | |
|---|---|---|---|---|
| 2005/0160286 | A1* | 7/2005 | Currie | H04L 63/1433 726/22 |
| 2010/0333168 | A1* | 12/2010 | Herrod | H04W 12/00 726/1 |
| 2016/0127394 | A1* | 5/2016 | Hadden | H04L 63/1433 726/23 |
| 2017/0098087 | A1* | 4/2017 | Li | H04L 63/1416 |
| 2020/0053117 | A1* | 2/2020 | Mandal | H04L 63/1433 |
| 2021/0049127 | A1* | 2/2021 | Kunchakarra | G06F 11/3688 |
| 2021/0185073 | A1* | 6/2021 | Ewaida | H04L 63/1433 |
| 2022/0103587 | A1* | 3/2022 | Velugu | H04L 63/1416 |
| 2023/0106027 | A1* | 4/2023 | Knott | G06F 11/0775 705/7.21 |
| 2023/0176837 | A1* | 6/2023 | Sethi | G06F 8/73 717/106 |

OTHER PUBLICATIONS

Ballani, Hitesh, et al. Off by default!. microsoft.com. (Year: 2005).*

Yang, Jiahai, Peiyu Wang, and Jianping Wu. "A scalable, web-based architecture for hierarchical network management." Seamless Interconnection for Universal Services. Global Telecommunications Conference. GLOBECOM'99.(Cat. No. 99CH37042). vol. 3. IEEE. (Year: 1999).*

Xu, Yunjing, et al. "CANVuS: Context-aware network vulnerability scanning." Recent Advances in Intrusion Detection: 13th International Symposium, RAID 2010, Ottawa, Ontario, Canada, Sep. 15-17, 2010. Proceedings 13. Springer Berlin Heidelberg. (Year: 2010).*

"International Search Report and Written Opinion Issued in PCT Application No. PCT/US23/021290", Mailed Date: Aug. 7, 2023, 13 Pages.

* cited by examiner

DISTRIBUTED HARDWARE VULNERABILITY IDENTIFICATION AND RESOLUTION

BACKGROUND

Modern networked computing environments include a large number of devices, both physical and virtual. Many if not all of these devices provide adversaries an avenue to explore for potential exploitation. Thus, as networked computing environments grow, adding more devices, exposure to adversaries grows at least in equal proportion. Adversaries thereby have a wide surface area to attack the system host, customers, and other partners.

SUMMARY

Various embodiments herein include distributed hardware vulnerability identification and resolution. One method embodiment includes conducting an inventory of devices on a network and generating a queue of scanning jobs for each inventoried device to discover possible modes of network entry via each device. The method then proceeds by scanning devices on the network that are to be blocked according to a stored representation of an expected configuration of each device to identify devices of interest and queuing a new job for a deep scan of each device of interest. Each deep scan is executed to search one or both of a greater portion and in greater detail of a device of interest than prior scanning. The method then passes deep scan results to an incident manager to open an incident ticket for each device of interest.

Some such method embodiments further include processing incident tickets by an automated incident response system (AIRS) to perform remedial actions on each device of interest. The processing of each incident ticket and associated device of interest may include identifying and initiating an appropriate job to reconfigure the device of interest and rescanning the device of interest to obtain a rescanning result. The method may then proceed with generating an alert to initiate investigation of the device of interest when the rescanning result is not as expected and updating the incident manager to close the incident ticket for the device of interest when the rescanning result is as expected.

Another embodiment is in the form of a system that includes a processor, a network interface device, and a memory storing modules executable by the processor to perform data processing activities. The modules and their data processing, in some embodiments, include a storage connector module executable by the processor to store and retrieve data from a shared data storage resource, a scanning module, a deep scanning module, and an automated incident response module.

The scanning module may be executable by the processor to retrieve, via the storage connector module, stored representations of devices on a network accessible via the network interface device, the stored representations of devices including data indicating all devices are blocked by default and identifies devices expressly opened. The scanning module may be further executable to scan all devices on the network to be blocked according to the retrieved stored representations to identify devices of interest, add devices of interest to a deep scanning queue, and store data representative of device scanning results via the storage connector module.

The deep scanning module may be executable by the processor to perform deep scanning of each device of interest present in the deep scanning queue and to pass deep scan results, via the storage connector module, to an incident manager module to open an incident ticket for each device of interest.

The automated incident response module may be executable by the processor to retrieve incident tickets, via the storage connector module, from the incident manager module and to process each incident ticket to perform remedial actions on each device of interest. In some such embodiments, processing of each incident ticket and associated device of interest may include identifying and initiating an appropriate job to reconfigure the device of interest and rescanning the device of interest to obtain a rescanning result. Subsequently, when the rescanning result is not as expected, the processing of the incident ticket may include generating an alert via the network interface device to initiate investigation of the device of interest and updating the incident manager module, via the storage connector module, to reflect the rescanning result. However, when the rescanning result is as expected, the processing of the incident ticket includes updating the incident manager module, via the storage connector module, to close the incident ticket.

DETAILED DESCRIPTION

Figure 1:
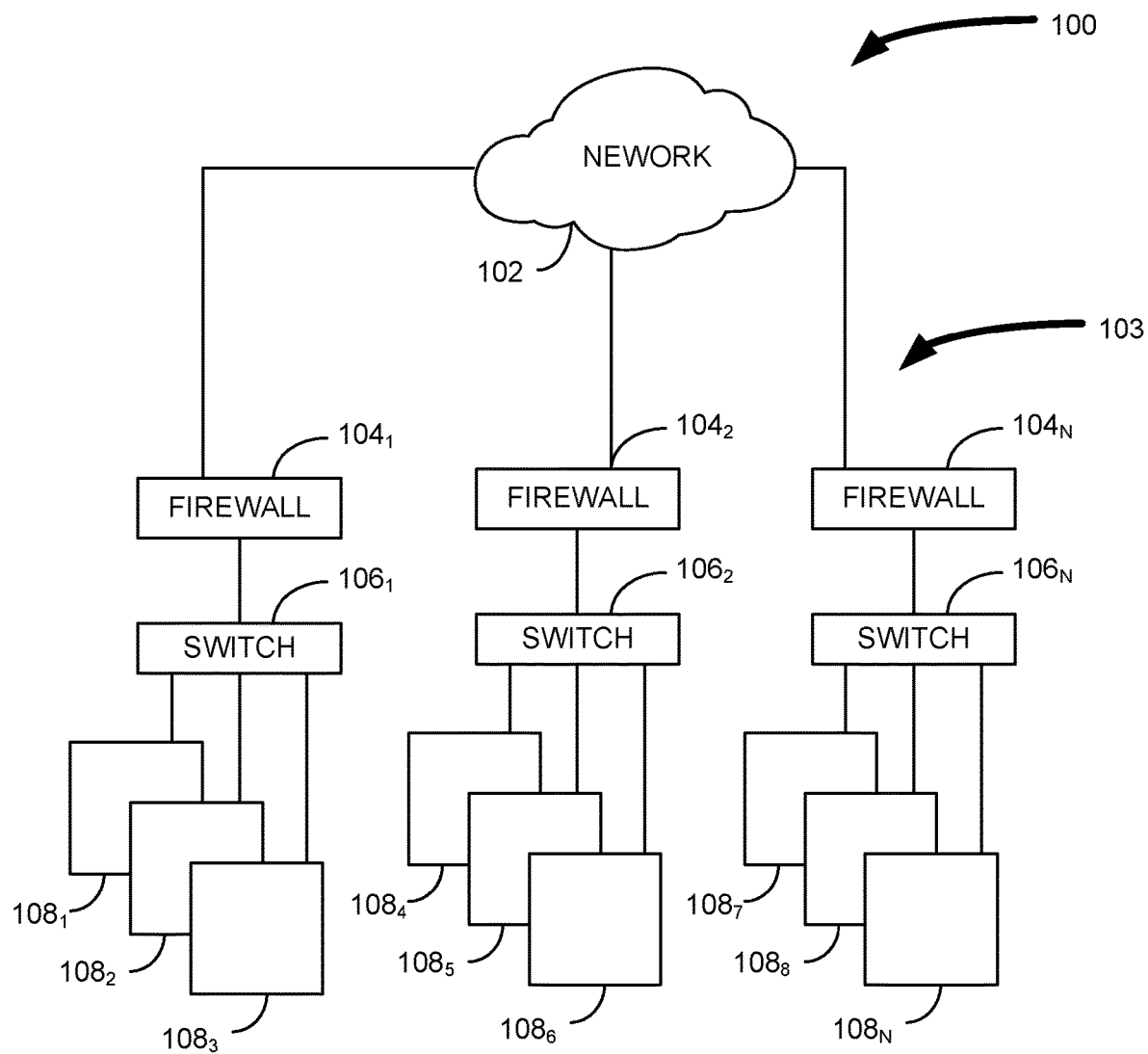
FIG. 1 is a diagram of a networked computing environment, according to an example embodiment.

As discussed above, as networked computing environments grow, adding more devices, exposure to adversaries grows at least in equal proportion. Such networked computing environments thereby provide a wide and growing surface area for adversaries to attack the system host, customers, and other partners. To limit this exposure, various embodiments herein deploy safe, known networking device configurations and monitoring conformance therewith. Monitoring is performed to monitor not only for nefarious actions, but also the errant and non-compliant. These embodiments also prevent the networked environment from becoming overly burdened by the monitoring by distributing performance of monitoring tasks and correcting identified issues with an automated incident response service.

In some embodiments, agent software is deployed to computing devices, such as virtual machines, to scan network endpoint devices, such as those endpoints exposed to the Internet, to perform automated active scanning thereof. The agent software further reports exposure, alerts incident managers, and attempts to close the ports through application programming interfaces (APIs) to other services. The data reported by the agent software provides Network Operations Centers (NOCs) with a dashboard view of possible vulnerabilities to be monitored and investigated, either manually or automatically.

In these and other embodiments, a network graphing service periodically checks the current inventory of devices on the network and queues jobs for each device or subnet of exposed internet protocol (IP) addresses. These jobs are queued such that agent software that executes on computing devices is instructed to perform a scan, such as a port scan to identify open and closed ports of a device. The agents, upon completing a scan, send data for storage to a persistent database. If a port that is block-listed in an expected device configuration is detected as open in the data stored to the database, a new job for a deep scan of the device or subnet of the discrepancy is queued and may remain in the queue for deep scanning for an extended period. The results from the deep scan are then passed to an incident manager through an incident management system ticket while an automated incident response service (AIRS) picks up the results, analyzes them, and sends an appropriate job to reconfigure the device to resolve the issue, such as to close an open port. During the reconfiguration stage, AIRS may wait for the job to complete before attempting to scan the exposed port again. If too much time passes, the reconfiguration fails, or if AIRS detects a pattern in the exposed port, AIRS may immediately alert an on-call incident manager to investigate the issue. If the reconfiguration is complete, a rescan may be performed to ensure the discrepancy has been resolved, such as the port is no longer exposed, and the incident ticket is update and closed. However, while the device remains in the deep scan queue, the device will continue to have deep scans performed against it to ensure the device remain compliant. This continued deep scanning is useful as the device may be subject to attack or users may be wanting to change a configuration, but have not followed proper procedures or followed policy. While not all causes of discrepancies are nefarious, compliance is still important to provide a level of security that is expected and perhaps even required.

Meanwhile, those responsible for monitoring and maintaining the networked computing environment, such as engineers and network operations center personnel, can view in near real-time as the system completes its network wide scans with agent software, deep scanning, automated and manual reconfiguration, and ticketing through a dashboard. Such embodiments enable rapid scanning and compliance monitoring by distributing the scanning tasks and offloading the computing load across computing devices within the networked computing environment. Further, implementing these embodiments in a virtual computing environment enables allocation of computing resources to shared service portions, such as the AIRS, ticketing, and queueing elements. Accordingly, such embodiments are readily scalable and are adaptable to the subject computing environments and computing loads thereon.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a diagram of a networked computing environment 100, according to an example embodiment. The networked computing environment 100 is an example of an environment within which some embodiments may be implemented. The networked computing environment includes the Internet 102 or other wide area network. The networked computing environment 100 also includes one or more networks 103 each secured by at least one firewall $104_1$, $104_2$, $104_N$. Each of the networks also includes networking devices, such as switches $106_1$, $106_2$, $106_N$ that interconnects various other computing devices $108_{1-N}$, which may be any number of device types including server on which virtual machines are deployed and execute such that the networked computing environment 100 is a virtual computing environment.

In such embodiments where the computing environment 100 is a virtual computing environment, the various elements include administrative service software elements thereon. For example, the firewalls $104_1$, $104_2$, $104_N$, switches $106_1$, $106_2$, $106_N$, and computing devices $108_{1-N}$ may include software elements that are configurable and may be turned on an off by administrators to perform administrative services within the networked computing environment 100. Some such services include port distributed hardware vulnerability identification and resolution. Other services include automated incident response that operate to respond to identified exposure and system issues with the goal of resolution with little to no human intervention. Additional services include connectivity and data management and storage services that may be utilized by the various services to deliver their services, including queuing, data storage and retrieval, port scanning, taking a network device inventory of all devices within the networked computing environment, and the like.

Figure 2:
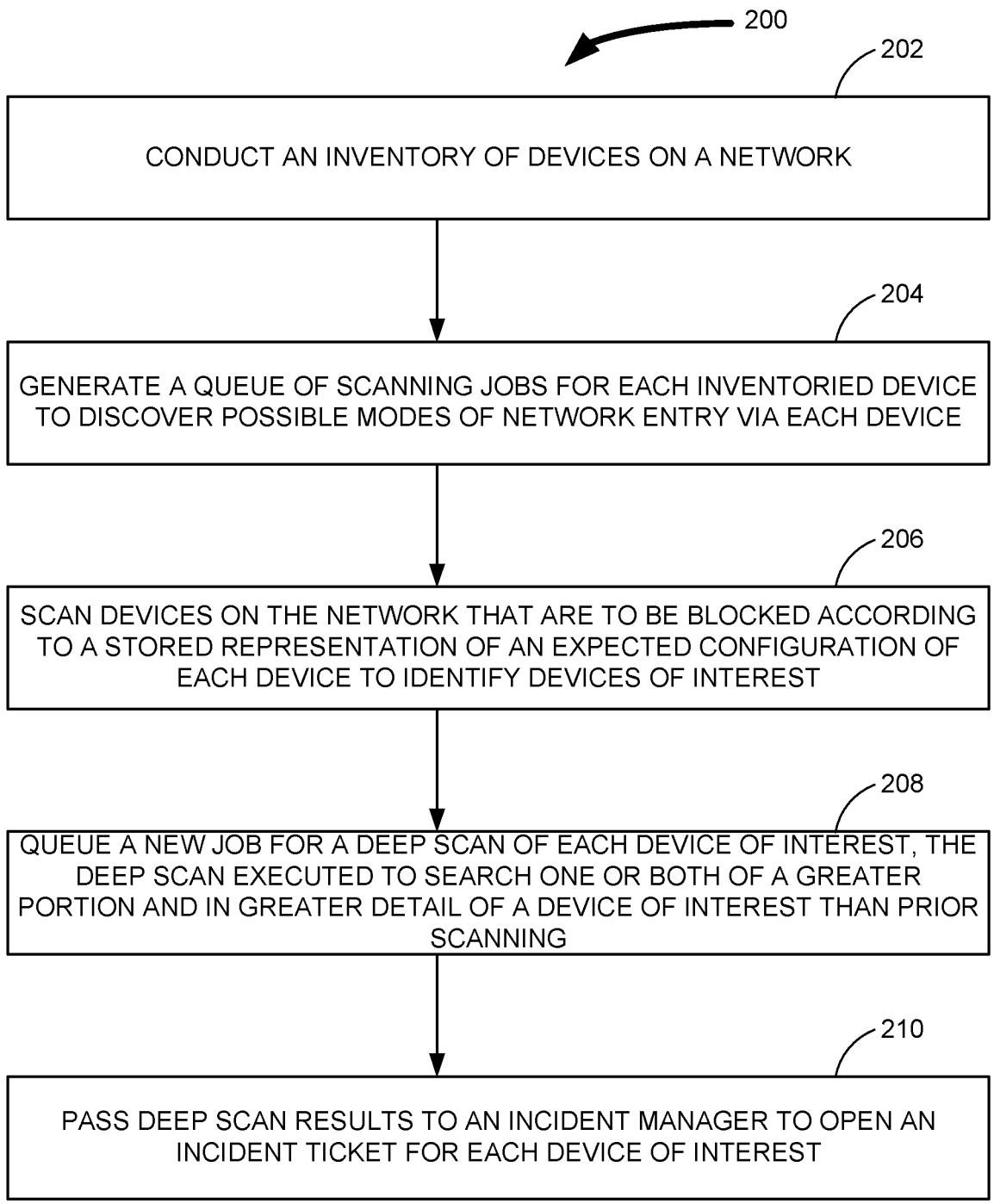
FIG. 2 is a block flow diagram of a method, according to an example embodiment.
Figure 3:
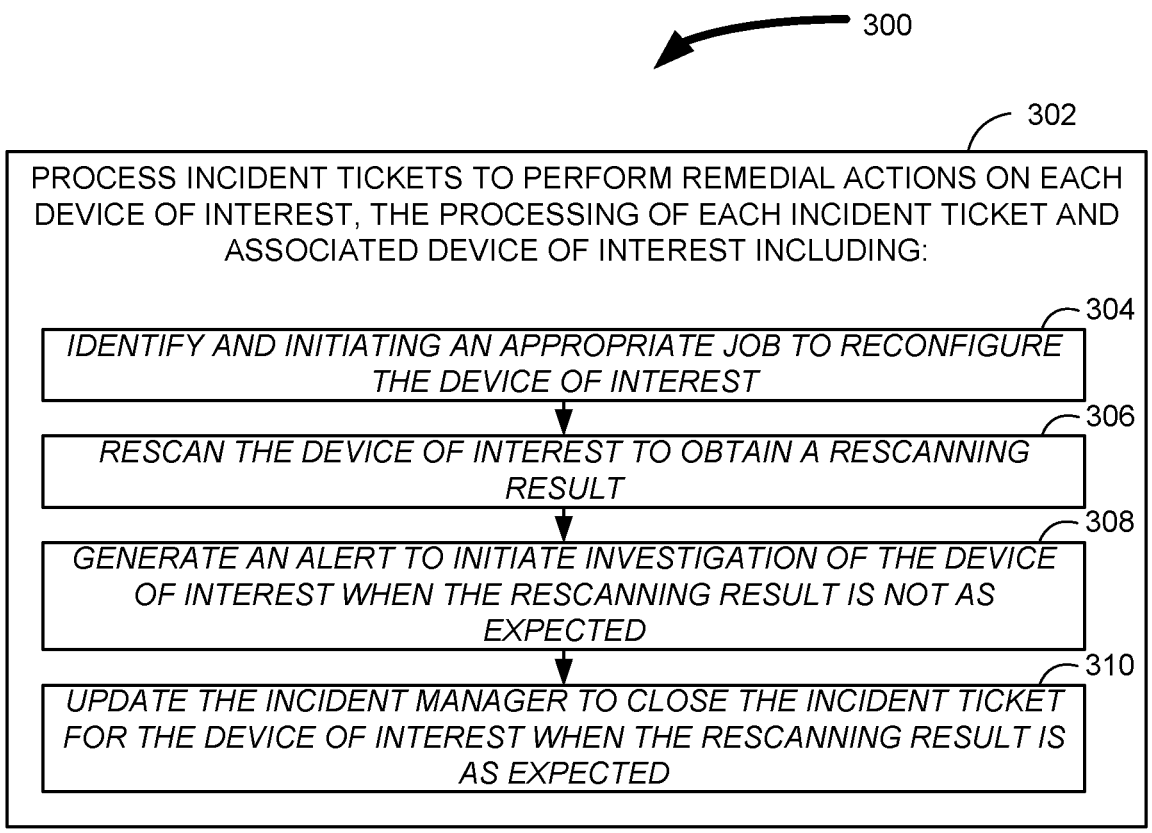
FIG. 3 is a block flow diagram of a method, according to an example embodiment.

FIG. 2 is a block flow diagram of a method 300, according to an example embodiment. The method 200 is an example of distributed hardware vulnerability identification. FIG. 3, described below, continues with resolution of hardware vulnerabilities identified by the method 200.

The method 200 includes conducting 202 an inventory of devices on a network and generating 204 a queue of scanning jobs for each inventoried device to discover possible modes of network entry via each device. The method 200 continues by scanning 206 devices on the network that are to be blocked according to a stored representation of an expected configuration of each device to identify devices of interest. In some such embodiments, a device that has more than one network connection port, i.e., more than one physical connection to a network, each network connection port is inventoried and treated as a device.

The scanning may 206 be performed by polling the various ports of the devices utilizing any number of possible protocols, such as Transmission Control Protocol (TCP), Universal Diagram Protocol (UDP), Internet Control Message Protocol (ICMP), and the like. The devices scanned 200 by the method 200 may include any device physically or virtually connected to the network. This may include networking devices such as switches, routers, smart devices such as cameras, physical security devices such as motion sensors, set top boxes, virtual machines, personal computers, mobile devices, and the like. However, in data center deployment embodiments, such as hosted virtual computing environments, the devices are often more limited to physical and virtual networking devices and computing devices such as servers.

In some embodiments, the scanning 206 is simultaneously performed by multiple instances of scanning services distributed amongst virtual machines in a virtual computing environment. The scanning 206 performed by each of these microservices updates a shared data storage system via an incident manager through which scanning progress and results can be monitored.

The method 200 continues with queuing 208 a new job for a deep scan of each device of interest. A queued deep scan is to be executed to search one or both of a greater portion and in greater detail of a device of interest than prior scanning. As a general notion, in some embodiments, the initial scan is performed to quickly identify devices that may have an issue and the deep scan is performed to find the confirm there is an issue with the device and to find the details of the issue. The method 200 then passes 210 deep scan results to the incident manager to open an incident ticket for each device of interest.

FIG. 3 is a block flow diagram of a method 300, according to an example embodiment. The method 300 is an example of embodiment of incident resolution, continuing from the method 200 of FIG. 2.

The method 300 includes processing 302 incident tickets by an AIRS to perform remedial actions on each device of interest. In some embodiments, the processing 302 of each incident ticket and associated device of interest includes identifying 304 and initiating an appropriate job to reconfigure the device of interest. Identifying 304 the appropriate job to reconfigure the device, in some embodiments, relies upon an executable knowledge base stored in a database or other storage indexed by identifiable characteristics. These characteristics are data elements that can be matched with characteristics of vulnerabilities identified by the deep scanning, such as open ports that should be closed, abilities to communicate with a device via a protocol that should not be possible, and the like. An identified 304 job is executable to reconfigure the device of interest to remediate the identified vulnerability.

Once the identified 304 job has completed, the method 300 includes rescanning 306 the device of interest to obtain a rescanning result. When the rescanning 306 result is not as expected, such as a configuration setting of the device of interest is still not as expected or still allows network traffic that should be denied, the method 300 generates 308 an alert to initiate investigation of the device of interest, such as by updating the incident manager or sending a message to an administrator. However, when the rescanning 306 result is as expected, the method 300 includes updating 310 the incident manager to close the incident ticket for the device of interest. In some embodiments, when the rescanning 306 result is as expected, the device of interest will remain in a deep scanning queue for recurrent monitoring for a longer period. As the device of interest has had an issue, further monitoring may be warranted to ensure the device of interest is not again compromised.

Figure 4:
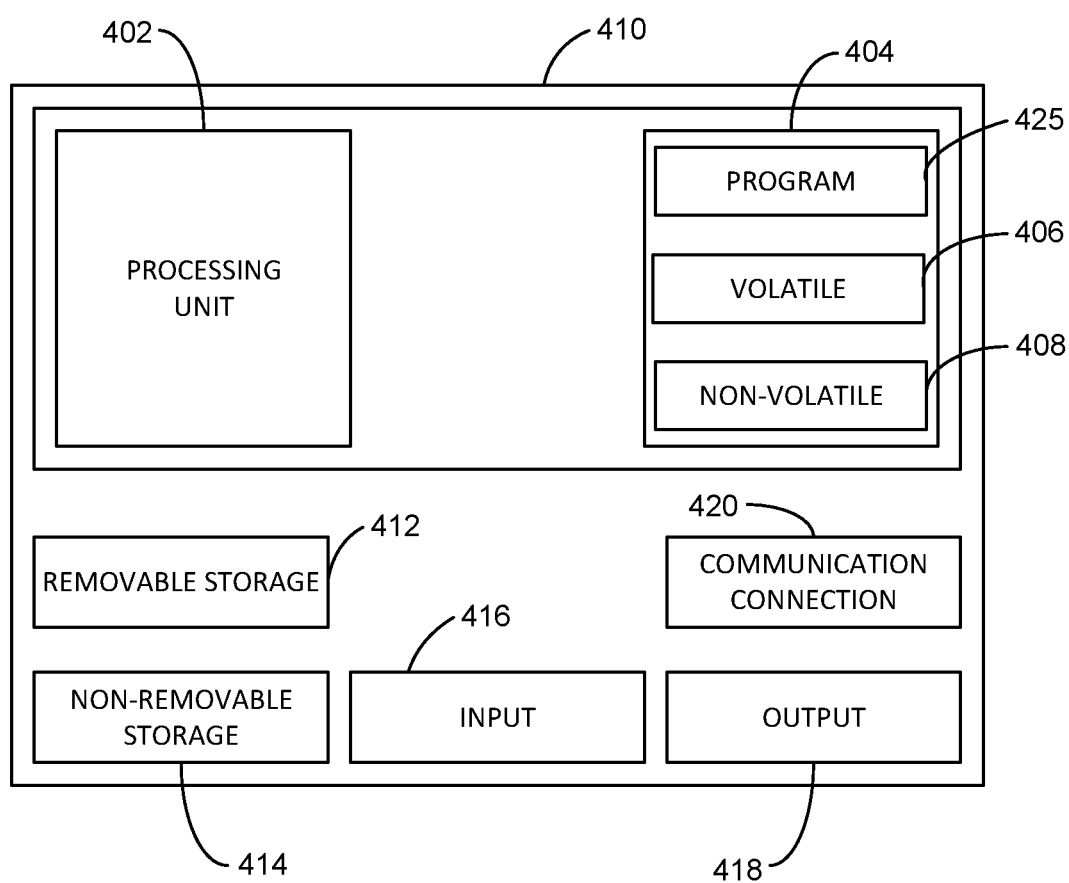
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers, such as database servers. The remote computer may include a personal computer (PC), server, router, switch, firewall, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a non-transitory computer-readable medium. For example, a computer program 425 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 410 to provide generic access controls in a COM based computer network system having multiple users and servers. In some embodiments, the computer program 425 includes virtual machine software to enable the computing device to provide a virtual computing environment within which one or multiple virtual computing devices execute.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
conducting an inventory of devices on a network;
generating a queue of scanning jobs for each inventoried device to discover possible modes of network entry via each device, each scanning job of the scanning jobs configured as an initial scan with instructions to distribute the initial scan amongst a plurality of microservices of a virtual computing environment for identification of misconfiguration of an inventoried device;
scanning devices on the network that are to be blocked according to a stored representation of an expected configuration of each device to identify devices of interest, the devices of interest being identified as misconfigured by the initial scan;
queuing a new job for a deep scan of each device of interest, the deep scan executed to search one or both of a greater portion and in greater detail of a device of interest than the initial scan;
passing deep scan results to an incident manager, via a shared data storage system accessible by the incident manager and each microservice of the plurality of microservices, to open an incident ticket for each device of interest; and
processing the incident ticket for each device of interest by an automated incident response system (AIRS) to perform remedial actions on each device of interest, the processing of the incident ticket and for each device of interest comprising:
identifying and initiating an appropriate job to reconfigure the device of interest, wherein the appropriate job includes an application programmer interface (API) call for a service, the API call for the service configured to instruct the service to close an open port of the device of interest identified in the deep scan results, wherein the appropriate job is identified based on a match between characteristics of the deep scanning results and identifiable characteristics included in an executable knowledge base indexed by the identifiable characteristics;
rescanning the device of interest to obtain a rescanning result; and
updating the incident manager to close the incident ticket when the rescanning result is as expected.

2. The method of claim 1, wherein at least one device has a plurality of network connection ports and each network connection port is inventoried and treated as a device.

3. The method of claim 1, wherein scanning devices on the network includes scanning utilizing a plurality of Transmission Control, User Diagram, and Internet Control Message Protocols (TCP, UDP, and ICMP).

4. The method of claim 1, further comprising:
processing incident tickets by an automated incident response system (AIRS) to perform remedial actions on each device of interest, the processing of each incident ticket and associated device of interest including:
identifying and initiating an appropriate job to reconfigure the device of interest;
rescanning the device of interest to obtain a rescanning result;
generating an alert to initiate investigation of the device of interest when the rescanning result is not as expected; and
updating the incident manager to close the incident ticket for the device of interest when the rescanning result is as expected.

5. The method of claim 4, wherein not as expected rescanning identifies a configuration setting of the device of interest that permits network traffic that should be denied.

6. The method of claim 4, wherein when the rescanning result is as expected, further placing the device of interest in a recurring deep scan queue for recurrent monitoring over a period.

7. The method of claim 4, wherein scanning and deep scanning are performed by instances of microservices present within virtual machines that execute upon computing hardware that includes the device or is physically coupled thereto.

8. The method of claim 1, wherein scanning is simultaneously performed by multiple instances of scanning microservices distributed amongst virtual machines in a virtual computing environment, the scanning microservices each updating a shared data storage system via the incident manager through which scanning progress and results can be monitored.

9. A method comprising:
scanning all devices on a network to be blocked according to stored representations of expected configurations of the devices to identify devices of interest, wherein the scanning is configured as an initial scan with instructions to distribute the initial scan amongst a plurality of microservices of a virtual computing environment for identification of misconfiguration of an inventoried device, the devices of interest being identified as misconfigured by the initial scan;
queuing and performing a deep scan job for each device of interest, wherein the deep scan job searches one or both of a greater portion and in greater detail of each device of interest than the initial scan;
passing deep scan results to an incident manager, via a shared data storage system accessible by the incident manager and each microservice of the plurality of microservices, to open an incident ticket for each device of interest; and
processing incident tickets by an automated incident response system (AIRS) to perform remedial actions on each device of interest, the processing of each incident ticket and associated device of interest including:
identifying and initiating an appropriate job to reconfigure the device of interest, wherein the appropriate job includes an application programmer interface (API) call for a service, the API call for the service configured to instruct the service to close an open port of the device of interest identified in the deep scan results, wherein the appropriate job is identified based on a match between characteristics of the deep scanning results and identifiable characteristics included in an executable knowledge base indexed by the identifiable characteristics;
rescanning the device of interest to obtain a rescanning result;
generating an alert to initiate investigation of the device of interest when the rescanning result is not as expected; and
updating the incident manager to close the incident ticket when the rescanning result is as expected.

10. The method of claim 9, wherein at least one device has a plurality of network connection ports and each network connection port is inventoried and treated as a device.

11. The method of claim 9, wherein scanning devices on the network includes scanning utilizing at least two of Transmission Control, User Diagram, and Internet Control Message Protocols (TCP, UDP, and ICMP).

12. The method of claim 9, wherein not as expected rescanning identifies a configuration setting of the device of interest that permits network traffic that should be denied.

13. The method of claim 9, wherein when the rescanning result is as expected, further placing the device of interest in a recurring deep scan queue for recurrent monitoring over a period.

14. The method of claim 9, wherein scanning and deep scanning performed by instances of microservices present within virtual machines that execute upon computing hardware that includes the device or is physically coupled thereto.

15. The method of claim 9, wherein the scanning is simultaneously performed by multiple instances of scanning microservices distributed amongst virtual machines in a virtual computing environment, the scanning microservices each updating a shared data storage system via the incident manager through which scanning progress and results can be monitored.

16. A system comprising:
a processor;
a network interface device; and
a memory storing modules executable by the processor to perform data processing activities, the modules and their data processing comprising:
  a storage connector module executable by the processor to store and retrieve data from a shared data storage resource;
  a scanning module executable by the processor to:
    retrieve, via the storage connector module, stored representations of devices on a network accessible via the network interface device, the stored representations of devices including data indicating all devices are blocked by default and identifies devices expressly opened;
    scan all devices on the network to be blocked according to the retrieved stored representations to identify devices of interest, wherein the scan is configured as an initial scan with instructions to distribute the initial scan amongst a plurality of microservices of a virtual computing environment for identification of misconfiguration of an inventoried device, the devices of interest being identified as misconfigured by the initial scan;
    add devices of interest to a deep scanning queue; and
    store data representative of device scanning results via the storage connector module;
  a deep scanning module to:
    perform deep scanning of each device of interest present in the deep scanning queue, wherein the deep scanning searches one or both of a greater portion and in greater detail of each device of interest than the initial scan; and
    pass deep scan results, via the storage connector module, using a shared data storage system accessible by an automated incident response module and each microservice of the plurality of microservices, to an incident manager module to open an incident ticket for each device of interest; and
  the automated incident response module executable by the processor to:
    retrieve incident tickets, via the storage connector module, from the incident manager module; and
    process each incident ticket to perform remedial actions on each device of interest, the processing of each incident ticket and associated device of interest including:
      identifying and initiating an appropriate job to reconfigure the device of interest, wherein the appropriate job includes an application programmer interface (API) call for a service, the API call for the service configured to instruct the service to close an open port of the device of interest identified in the deep scan results, wherein the appropriate job is identified based on a match between characteristics of the deep scanning results and identifiable characteristics included in an executable knowledge base indexed by the identifiable characteristics;
      rescanning the device of interest to obtain a rescanning result;
      generating an alert via the network interface device to initiate investigation of the device of interest when the rescanning result is not as expected and updating the incident manager module, via the storage connector module, to reflect the rescanning result; and
      updating the incident manager module, via the storage connector module, to close the incident ticket when the rescanning result is as expected.

17. They system of claim 16, wherein the system is deployed withing a virtual computing environment and the modules execute on different physical computing devices and upon different virtual machines.

18. The system of claim 16, wherein at least one device has a plurality of network connection ports and each network connection port is inventoried and treated as a device by the modules.

19. The system of claim 16, wherein not as expected rescanning within the deep scanning module identifies a configuration setting of the device of interest that permits network traffic that should be denied.

20. The system of claim 16, wherein when the rescanning result is as expected within the deep scanning module, the deep scanning module is further executable to place, via the storage connector module, the device of interest in a recurring deep scan queue for recurrent monitoring over a period.

* * * * *